United States Patent [19]
Hamilton

[11] Patent Number: 5,564,756
[45] Date of Patent: Oct. 15, 1996

[54] DUCT COUPLING PAD FOR JOINING FLEXIBLE DUCTS

[76] Inventor: Tom Hamilton, Hwy. 301 N., P.O. Box 667, Dunn, N.C. 28335

[21] Appl. No.: 463,916

[22] Filed: Jun. 5, 1995

[51] Int. Cl.$^6$ .................................................. F16L 41/00
[52] U.S. Cl. .......................... 285/222; 411/178; 277/178; 285/915; 285/910; 285/150; 16/2
[58] Field of Search .................................. 16/2; 156/212, 156/214, 215, 497, 483, 484, 488, 493; 411/321, 531; 277/178, 189; 174/65 G, 153 G; 285/197, 915, 222, 910, 150, 424; 604/355, 344

[56] References Cited

U.S. PATENT DOCUMENTS

| | | | |
|---|---|---|---|
| 2,501,465 | 3/1950 | Caramanoff | 16/2 |
| 2,684,400 | 7/1954 | Redmond | 174/153 G |
| 3,188,121 | 6/1965 | Cude et al. | 285/197 |
| 3,328,854 | 7/1967 | Tombari | 16/2 |
| 3,788,655 | 1/1974 | Hathaway | 174/153 G |
| 4,620,729 | 11/1986 | Kauffman | 285/915 |
| 4,699,212 | 10/1987 | Andersson | 16/2 |
| 5,002,327 | 3/1991 | Burkit | 285/197 |
| 5,314,212 | 5/1994 | Sanders | 285/424 |
| 5,393,106 | 2/1995 | Schroeder | 285/424 |
| 5,411,299 | 5/1995 | Wagner | 285/915 |

Primary Examiner—Eric K. Nicholson

[57] ABSTRACT

A duct coupling pad for joining flexible ducts includes an outer section surrounding a central opening. An adhesive coating is applied to one surface of the coupling pad for adhering the pad to a first one of the ducts to be joined. An opening is formed in the first duct within the area of the central opening of the coupling pad. Securing tabs integrally formed with the outer section of the coupling pad are folded inwardly into the opening in the first duct and adhered to the inner surface thereof. The coupling pad binds the edge of the opening in the first duct to prevent splitting and tearing of the linings. A collar is inserted into the central opening of the coupling pad and the second duct is connected to the collar.

8 Claims, 3 Drawing Sheets

DUCT COUPLING PAD FOR JOINING FLEXIBLE DUCTS

FIELD OF THE INVENTION

The present invention relates to heating, ventilating and air conditioning systems and, more particularly, to an apparatus for joining flexible ducts.

BACKGROUND OF THE INVENTION

Flexible ducts are commonly used in residential construction because they provide a low-cost, simple, and efficient duct system for conveying heated and/or cooled air throughout a home. Furthermore, flexible ducts are light-weight and can collapse into a small package which can be easily transported to a construction site. The installation of flexible ducts is far less time-consuming and expensive than using conventional duct work.

While flexible ducts are in wide-spread use, there has yet to be found a simple and reliable method for joining flexible ducts together. Typically, a branch is formed in flexible duct work by using a metal junction box or plenum constructed of sheet metal. The flexible ducts are joined to the plenum using a collar, also made of sheet metal. The plenum is typically constructed on site by the HVAC contractor. A hole is cut in the side of the plenum in which the metal collar is mounted. The flexible duct fits over the end of the metal collar and is secured, usually by duct tape.

In a typical construction project, a substantial portion of the time spent installing duct work is spent constructing plenums for joining flexible ducts together. Therefore, a simpler and easier method for joining duct work is needed which avoids the necessity of constructing plenums for joining duct work together.

SUMMARY OF THE INVENTION

The present invention provides a method and apparatus for directly connecting flexible ducts to one another without the use of metal junction boxes or plenums. The invention comprises an adhesive pad which is applied to the main duct and serves as a mounting surface for a standard collar or pipe fitting.

The adhesive pad is made of a pliable, closed-cell foam material. A central opening is formed in the pad which is surrounded by an outer section. A plurality of bendable tabs extend from the outer section of the pad into the central opening. An adhesive coating is applied to the bottom of the pad which is protected by a peel-off layer.

To use the duct coupling pad of the present invention, the peel-off membrane is removed and the pad is applied to the outer surface of the main duct. After firmly securing the duct coupling pad to the main duct, an opening is cut in the main duct within the area of the central opening of the pad. To cut the opening in the main duct, the tabs of the duct coupling pad can be lifted. The size of the opening in the main duct should be roughly equal to the size of the central opening in the duct coupling pad. Once the opening in the main duct is formed, the tabs are folded inwardly and adhered to the inner surface of the main duct. Thus, the duct coupling pad of the present invention binds the edge of the opening formed in the main duct and prevents the metal or vinyl backing of the main duct from splitting or tearing. A standard metal collar can then be mounted in the opening formed in the main duct to allow connection of a smaller duct.

Based on the foregoing, it is a primary object of the present invention to provide an adhesive pad for joining flexible ducts without the need for junction boxes or plenums constructed of sheet metal.

A further object of the present invention is to provide a method and apparatus for connecting flexible ducts which will substantially reduce the time and expense associated with the installation of duct work.

A further object of the present invention is to provide a method and apparatus for joining flexible ducts with a substantially air-tight connection between the ducts.

A further object of the present invention is to provide a method and apparatus for joining flexible ducts which is relatively simple in construction and easy to use.

Another object of the present invention is to provide a method and apparatus for joining flexible ducts which will provide a long-lasting connection and will be relatively trouble free in installation.

DETAILED DESCRIPTION OF THE INVENTION

Figure 1:
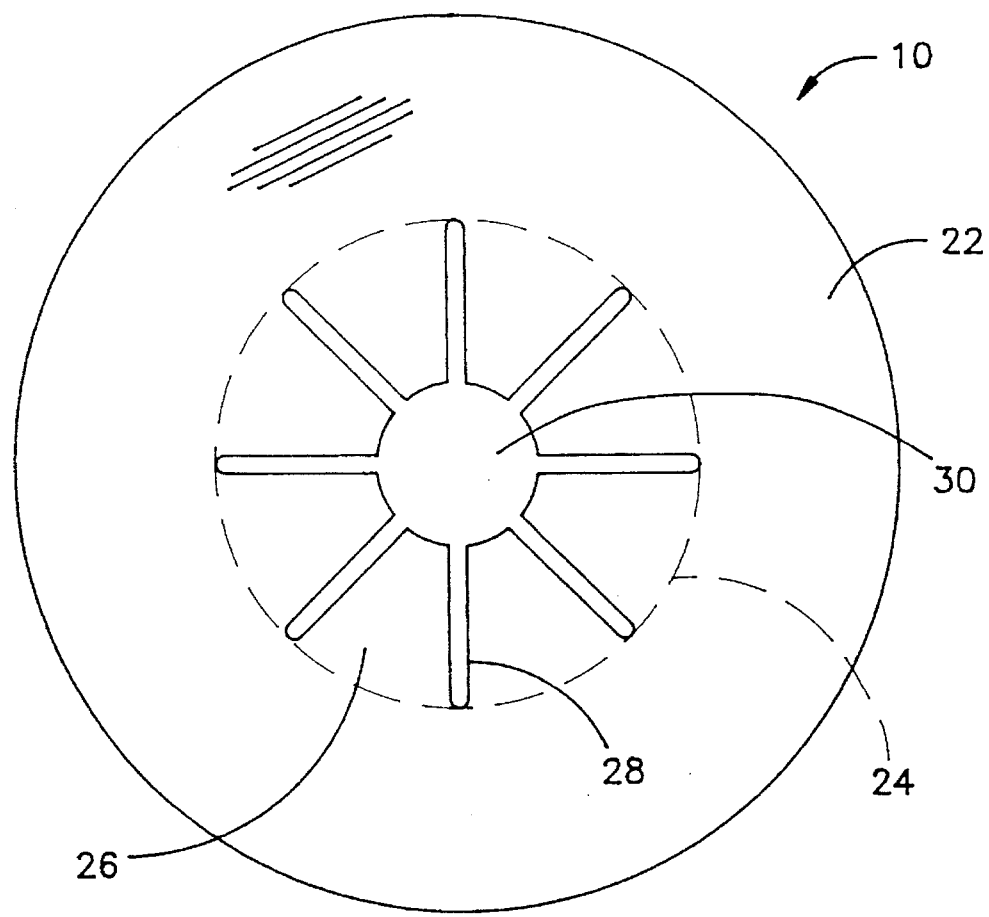
FIG. 1 is a top plan view of the duct coupling pad used in connection with the present invention.
Figure 2:
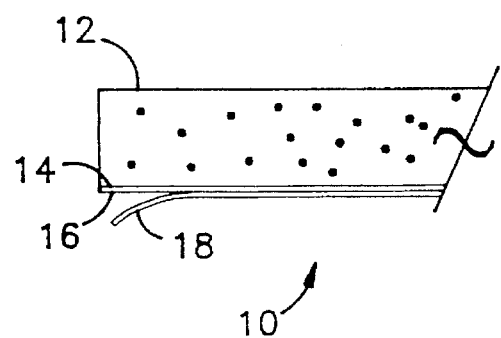
FIG. 2 is a partial section view of the duct coupling pad.

Referring now to the drawings, and particularly to FIGS. 1 and 2, an adhesive duct coupling pad used in connection with the present invention is shown and indicated generally by the numeral 10. The duct coupling pad 10 is made of a pliable, closed-cell foam material and includes a top surface 12 and a bottom surface 14. An adhesive coating 16 is applied to the bottom surface 14 of the pad 10 and is covered by a peel-off membrane 20. The purpose of the adhesive coating is to provide an air-tight bond with the surface of a main duct 40 as will be described below. Optionally, the adhesive coating 16 may also be applied to the top surface 14 for providing an adhesive seal with a collar 50 as will be hereinafter described. If the adhesive coating is applied to the top surface 14, a peel-off membrane 60 is applied over the coating which can be removed by the user.

The duct coupling pad 10 has a generally circular configuration as shown best in FIG. 1. The duct coupling pad 10 includes a continuous outer section 22 which surrounds a central opening 24 in the pad. The outer boundary of the central opening 24 is designated with a dotted line in FIG. 1. While the duct coupling pad has been described as having a circular configuration, it will be readily apparent to those skilled in the art that the shape of the pad is not an essential element of the invention and that other shapes may be used. However, since most ducts have a circular configuration, a circular-shaped pad will be the preferred form in most applications.

Extending from the outer section 22 into the central opening 24 are a plurality of securing tabs 26. The securing tabs 26 are separated by narrow slots 28 which extend from a void area 30 in the center of the pad 10 to the edge of the center opening 24. The tabs 26 are integrally formed with the outer section 22 and are sufficiently flexible so that the tabs can be folded back against the outer section 22.

The pad material used in connection with the present invention is an acrylic foam which is commercially available in sheet form. For example, the 3M Company manufacturers a family of acrylic foam tapes designated as VHB Tapes™. The VHB family of acrylic foam tapes manufactured by the 3M Company are characterized by high tensile, shear and peel adhesion which provide a long-lasting bond. The duct coupling pad 10 can be manufactured using acrylic foam tapes or other foam product having similar characteristics and adhesive qualities.

Figure 4A:
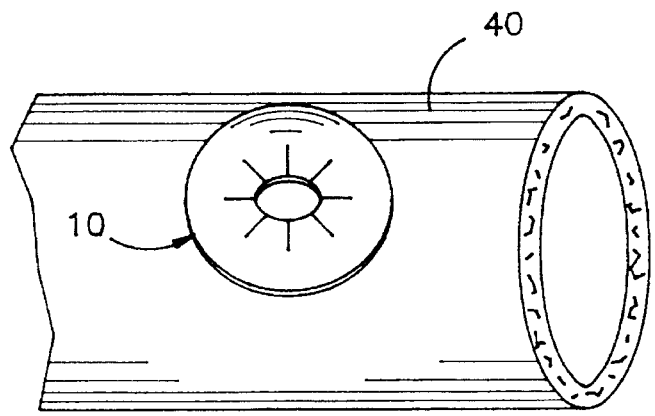
FIGS. 4A and 4B are perspective views illustrating the method employed in the present invention of joining a smaller duct to a larger main duct.
Figure 4B:
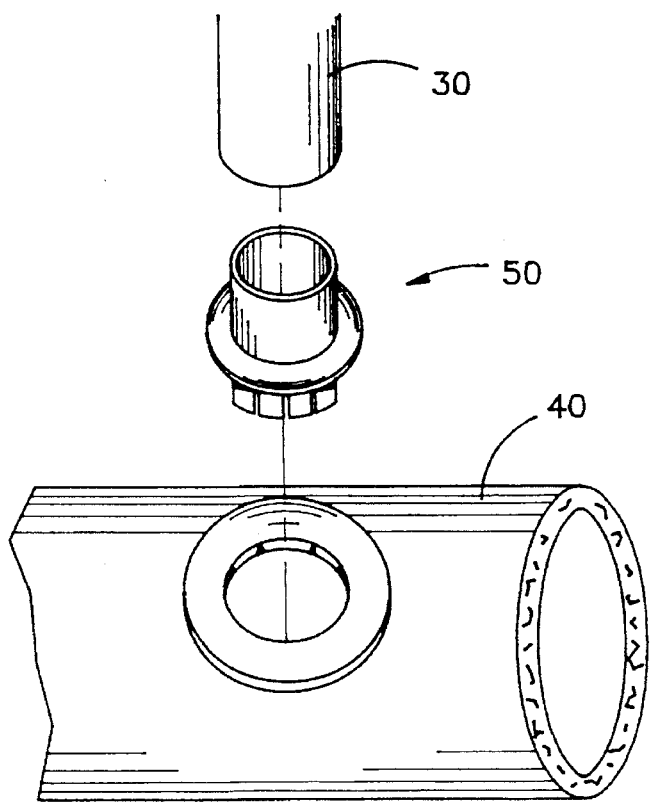

The duct coupling pad of the present invention is used to provide a simple and reliable method for joining smaller branch ducts to larger main ducts in a flexible duct system. FIGS. 4A and 4B illustrate the method of using the duct coupling pad to join a branch duct 30 to a main duct 40. First, the duct coupling pad 10 is secured to the outer surface of the main duct 40 at the location where the branch duct 50 is to be connected. The duct coupling pad 10 is secured by removing the peel-off membrane 18 on the outer section 22 of the duct coupling pad 10 and firmly pressing the duct coupling pad 10 against the outer surface of the main duct 40. Once the outer section 22 is secured to the main duct 40, it will form an air-tight seal. After securing the duct coupling pad 10 to the main duct 40, an opening is cut into the main duct 40 within the area defined by the central opening 24 of the duct coupling pad 10. The opening in the main duct 40 is formed by first slitting the main duct 40 and then using a pair of snips and/or blade to cut away the portions of the main duct 40 within the central opening 24 of the duct coupling pad 10. The opening in the main duct should be roughly equal in size to the central opening 24 of the duct coupling pad 10.

Figure 3:
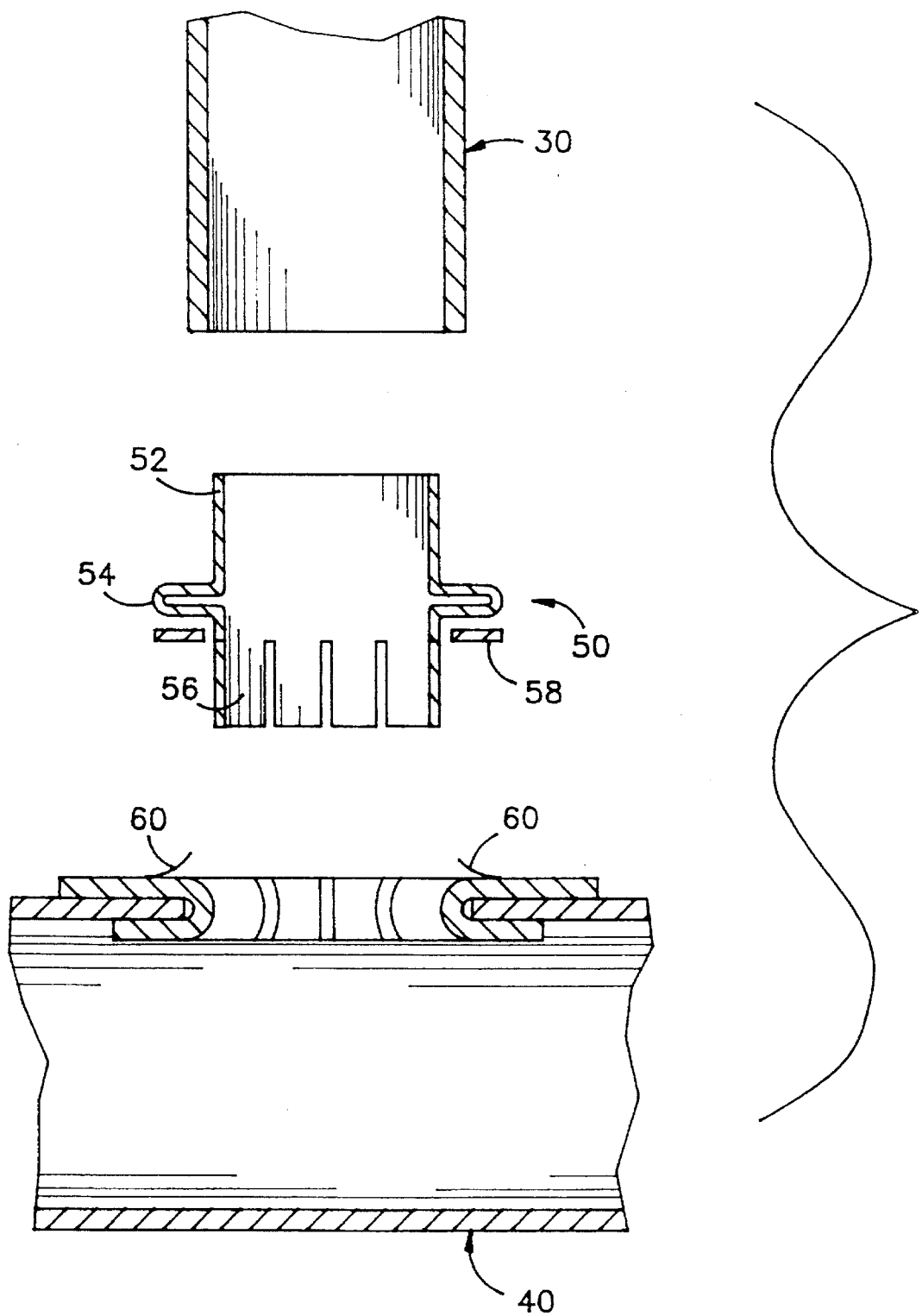
FIG. 3 is a partial section view of a portion of a duct system constructed in accordance with the present invention.

Once an opening is formed in the main duct 40, the peel-off membrane on each of the tabs 26 is removed and the tabs 26 are folded back into the main duct 40 such that the securing tabs adhere to the inner lining of the main duct 40 as shown in FIG. 3. The individual securing tabs 26 are pressed firmly against the inner lining of the main duct 40 to bind the edge of the main duct 40 surrounding the newly formed opening between the outer section 22 and the individual securing tabs 26 of the duct coupling pad 10. By binding the edge surrounding the opening in the main duct in this fashion, any tearing or splitting of the lining is prevented.

Once the duct coupling pad 10 is secured to the main duct 40, a collar 50 is inserted into the central opening 24 of the duct coupling pad 10. The collar 50 used in connection with the present invention is a conventional metal collar. The collar 50 comprises a small section of pipe 52 having an integrally formed flange 54. A series of tabs are formed on the inner end of the collar 50. The inner end of the collar 50 is inserted into the opening of the main duct 40 which has been reinforced by the duct coupling pad 10. When the flange 54 seats against the top surface 14 of the duct coupling pad 10, the collar tabs 56 are bent outward to secure the collar 50 in place. To assure that an air-tight seal is made, a gasket 58 may be interposed between the collar 50 and the top surface 14 of the duct coupling pad 10. Additionally, or in the alternative, an adhesive coating can also be applied to the top surface 14 to provide an adhesive seal between the duct coupling pad 10 and the flange 54 of the collar. After the collar 50 is secured in place, the branch duct 30 is inserted over the outer end of the collar 50 and secured in the usual fashion. For example, one suitable method for securing the flexible ducts to the fitting would be by wrapping duct tape around the end of the flexible duct.

What is claimed is:

1. A duct coupling apparatus for joining flexible ducts comprising:

a) a generally flat pad having top and bottom surfaces, said pad including a central opening surrounded by an outer section;

b) an adhesive coating applied to the bottom surface of the pad for applying the pad to an outer surface of one of the ducts to be joined such that the central opening in the pad aligns with an opening formed in said first duct in a way such that the outer section of said pad surrounds the opening formed in said first duct; and c) a plurality of securing tabs extending inwardly from the outer section of said pad into said central opening, said tabs being sufficiently flexible to allow said tabs to be folded inwardly and adhere to the inner surface of said first duct.

2. The duct coupling apparatus of claim 1 wherein said securing tabs are integrally formed with the outer section of said pad.

3. The duct coupling apparatus of claim 2 wherein said securing tabs include an adhesive coating applied to a bottom surface thereof form adhering the securing tabs to the inner surface of the first duct.

4. The duct coupling apparatus of claim 1 wherein said duct coupling pad has a generally circular configuration.

5. The duct coupling apparatus of claim 4 wherein said securing tabs extend radially inward from the outer section of the pad.

6. The duct coupling apparatus of claim 5 wherein the securing tabs have a generally wedge-shaped configuration which tapers inwardly from the outer section of the pad.

7. A duct coupling system for joining two flexible ducts together, comprising:

a) an adhesive pad including a central opening surrounded by an outer section;

b) an adhesive coating applied to at least one surface of said pad for securing said pad to a first one of said ducts having an opening formed therein such that the outer section of said pad surrounds the opening in said first duct;

c) a plurality of securing tabs connected to the outer section of said coupling pad, said securing tabs sufficiently flexible to allow said tabs to be folded against and adhered to an inner surface of the first duct such that the edge of the opening in said first duct is bound between the outer section of said coupling pad and said securing tabs; and d) a collar for connecting said second duct to said first duct, said collar including a first end adapted to fit into the central opening in said coupling pad, and a second end adapted to fit into the end of said second duct.

8. A method for directly connecting to flexible ducts comprising:

a) applying an adhesive pad having a central opening surrounded by an outer section to the outer surface of a first one of said ducts;

b) forming an opening in said first duct within the area of the central opening of said coupling pad;

c) folding the securing tabs on said coupling pad into the first duct and adhering the securing tab to the inner surface of the first duct;

d) inserting a collar into the central opening of said coupling pad such that said collar communicates with the interior of said first duct; and e) connecting a second duct to said collar.

\* \* \* \* \*